(12) United States Patent
Qiu et al.

(10) Patent No.: US 10,655,745 B2
(45) Date of Patent: May 19, 2020

(54) QUICK CHANGE VALVE TRIM ASSEMBLY

(71) Applicant: FISHER CONTROLS INTERNATIONAL LLC, Marshalltown, IA (US)

(72) Inventors: Yan Qiu, Marshalltown, IA (US); Guo Dong Chua, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 15/922,853

(22) Filed: Mar. 15, 2018

(65) Prior Publication Data

US 2019/0285188 A1    Sep. 19, 2019

(51) Int. Cl.
| | |
|---|---|
| *F16K 27/02* | (2006.01) |
| *G05D 16/00* | (2006.01) |
| *F16K 1/38* | (2006.01) |
| *F16K 1/12* | (2006.01) |
| *F16K 1/42* | (2006.01) |
| *F16K 39/02* | (2006.01) |
| *F16K 3/24* | (2006.01) |
| *F16K 47/08* | (2006.01) |
| *F16K 1/06* | (2006.01) |
| *F16K 1/54* | (2006.01) |
| *F16K 27/04* | (2006.01) |

(Continued)

(52) U.S. Cl.
CPC ........... *F16K 27/0254* (2013.01); *F16K 1/06* (2013.01); *F16K 1/12* (2013.01); *F16K 1/38* (2013.01); *F16K 1/427* (2013.01); *F16K 1/54* (2013.01); *F16K 3/246* (2013.01); *F16K 3/314* (2013.01); *F16K 27/041* (2013.01); *F16K 39/022* (2013.01); *F16K 47/08* (2013.01); *G05D 16/00* (2013.01); *F16K 41/02* (2013.01)

(58) Field of Classification Search
CPC .......... F16K 27/0254; F16K 1/38; F16K 1/12; F16K 1/42
USPC .............................. 137/625.33; 251/284–286
See application file for complete search history.

(56) References Cited

U.S. PATENT DOCUMENTS

| | | | |
|---|---|---|---|
| 3,298,389 A | * | 1/1967 | Freeman ................... F16K 1/12 137/454.6 |
| 5,964,248 A | | 10/1999 | Enarson et al. |

(Continued)

FOREIGN PATENT DOCUMENTS

CN    205190796    4/2016

OTHER PUBLICATIONS

International Search Report and Written Opinion for PCT/US2019/020883, dated Jun. 3, 2019.

*Primary Examiner* — Kevin L Lee
(74) *Attorney, Agent, or Firm* — Marshall, Gerstein & Borun LLP

(57) ABSTRACT

A pressure regulator includes a valve body having a fluid inlet and a fluid outlet connected by a fluid passageway. An orifice is disposed between the fluid inlet and the fluid outlet. A valve seat is disposed within the fluid passageway. A movable valve plug is disposed within the fluid passageway, and the valve plug interacts with the valve seat to selectively open or close the fluid passageway. A cage is disposed in the fluid passageway, the cage surrounds the valve plug, and the cage includes a mechanical stop that limits movement of the valve plug within the cage away from the valve seat.

19 Claims, 4 Drawing Sheets

(51) Int. Cl.
*F16K 3/314* (2006.01)
*F16K 41/02* (2006.01)

(56) References Cited

U.S. PATENT DOCUMENTS

| | | | |
|---|---|---|---|
| 7,152,628 B2 * | 12/2006 | Folk et al. ............. | F16K 25/04 137/625.33 |
| 7,373,951 B2 * | 5/2008 | Gossett et al. .......... | F16K 47/08 137/625.33 |
| 7,578,314 B2 * | 8/2009 | McCarty et al. ......... | F16K 1/34 137/625.33 |
| 2003/0192601 A1 | 10/2003 | Baumann | |
| 2010/0301253 A1 | 12/2010 | Perrault et al. | |
| 2016/0116072 A1 * | 4/2016 | Westwater ................ | F16K 1/42 251/170 |

* cited by examiner

QUICK CHANGE VALVE TRIM ASSEMBLY

FIELD OF THE DISCLOSURE

The present invention relates to control valves, and more particularly to a pressure regulator trim assembly that is removable as a unit to reduce repair and/or replacement time.

BACKGROUND

Pressure regulating valves/pressure regulators are used in myriad industrial and residential applications for controlling the downstream pressure of a fluid. For example, in chemical processing plants or oil refineries, pressure regulating valves are used to manipulate a flowing fluid to compensate for increases or decreases in demand, or other load disturbances, and thus keep the fluid pressure regulated. Similarly, pressure regulating valves may be used in plumbing fixtures to maintain a pre-determined pressure of fluid that automatically adjusts to variations in demand, such as anti-scald valves in showers or faucets. By controlling downstream pressure, pressure regulating valves compensate for variations in downstream demand. For example, as downstream demand increases, pressure regulating valves open to allow more fluid to flow through the pressure regulating valve, thus maintaining a relatively constant downstream pressure. On the other hand, as downstream demand decreases, pressure regulating valves close to reduce the amount of fluid flowing through the pressure regulating valve, again maintaining a relatively constant downstream pressure.

Pressure regulating valves have trim assemblies to control and/or characterize the flow of fluid through the valve. These trim assemblies include a movable control element, such as a valve plug, a valve seat, and a cage that retains the valve plug and characterizes the fluid flow through the valve.

Pressure regulating valves can be categorized as either balanced or unbalanced. Unbalanced valves typically have high pressure inlet fluid on one side of the valve plug and lower pressure outlet fluid on the other side of the valve plug. Unbalanced valves sometimes suffer from damage that occurs to the valve seat. In unbalanced valves with high inlet pressures, the fluid pressure acting on large valve orifices can crush the valve seat. This damage may require repair or replacement. Similarly, balanced valves can also suffer from damage or wear that requires occasional maintenance or repair.

When the valve cage in certain trim assemblies needs to be removed and/or replaced, the standard removal process includes first removing a bonnet that is attached to the valve body to access the internal components, such as the trim assembly. Next, the valve plug is removed by applying force to the valve stem, which pulls the valve plug out of the cage and thus out of the valve body. Finally, the cage may be removed. In cages having thin walls, the cage often becomes stuck within the valve body, thereby necessitating tapping additional lifting holes in the cage wall for extraction. This is a very time consuming and costly process. In other valves, a build up of material, for example magnetite in high pressure bypass valves, may cause the cage to stick within the valve body.

SUMMARY

In accordance an exemplary aspect, a pressure regulator includes a valve body having a fluid inlet and a fluid outlet connected by a fluid passageway, and an orifice disposed between the fluid inlet and the fluid outlet. A valve seat is disposed within the fluid passageway. A movable valve plug is disposed within the fluid passageway, the valve plug interacting with the valve seat to selectively open or close the fluid passageway. A cage is disposed in the fluid passageway, the cage surrounds the valve plug, and the cage includes a mechanical stop that limits movement of the valve plug relative to the cage away from the valve seat.

In accordance with another exemplary aspect, a trim assembly includes a valve seat and a valve plug, the valve plug being movable relative to the valve seat, the valve plug interacting with the valve seat to selectively open or close the valve seat. A cage is disposed in the fluid passageway, the cage surrounding the valve plug, and the cage including a mechanical stop that limits movement of the valve plug relative to the cage away from the valve seat.

In accordance with another exemplary aspect, a method of removing a trim assembly from a pressure regulator includes removing a bonnet from the pressure regulator, pulling on a valve stem that is connected to a valve plug to move the valve plug in relation to a cage until the valve plug engages a mechanical stop on the cage, and continuing to pull on the valve stem until the valve plug and the cage are extracted from a valve body as a unit.

The foregoing aspects may be combined with any one or more of the following preferred forms as well with other aspects and/or additional aspects, arrangements, features, and/or technical effects that are apparent upon detailed inspection of the Figures and the following description.

In one preferred form, the mechanical stop is an internal ring having a smaller diameter than a widest diameter on the valve plug.

In another preferred form, the cage includes a first region having a first diameter and a second region having a second diameter, the first diameter being larger than the second diameter and both the first and second diameters being larger than the internal ring diameter.

In another preferred form, the first region is located farther from the valve seat than the second region.

In another preferred form, the first region accommodates a piston ring and the second region accommodates a bore seal.

In another preferred form, the valve plug includes a balance passage.

In another preferred form, the valve seat is one of a welded seat, a bolted seat, a clamped seat, and a hung threaded seat.

In another preferred form, the trim assembly includes a plug seal retainer, the plug seal retainer securing a plug seal against the valve plug, and the plug seal forming a seal between the valve plug and the cage.

BRIEF DESCRIPTION OF THE DRAWINGS

The aforementioned features, advantages, and aspects of the present invention, will be apparent from the following description and accompanying drawings, wherein:

FIG. 3 is an enlarged cross-sectional view of the area labeled "SEE FIG. 3" of FIG. 1;

FIG. 4 is an enlarged cross-sectional view of a mechanical stop of the trim assembly of FIG. 1;

DETAILED DESCRIPTION

An illustrative embodiment of the present invention relates to a valve trim assembly for a pressure regulating valve that is removable from a valve body as a unit, thereby reducing removal and/or replacement time and eliminating the need for tapping extraction bores in a valve cage. The valve trim assembly includes a valve plug and a cage having a mechanical stop that prevents movement of the valve plug relative to the cage beyond a fully retracted position, thereby engaging the valve plug with the cage at the fully retracted position so that the valve plug and the cage are removable from the valve body as a unit.

Figure 1:
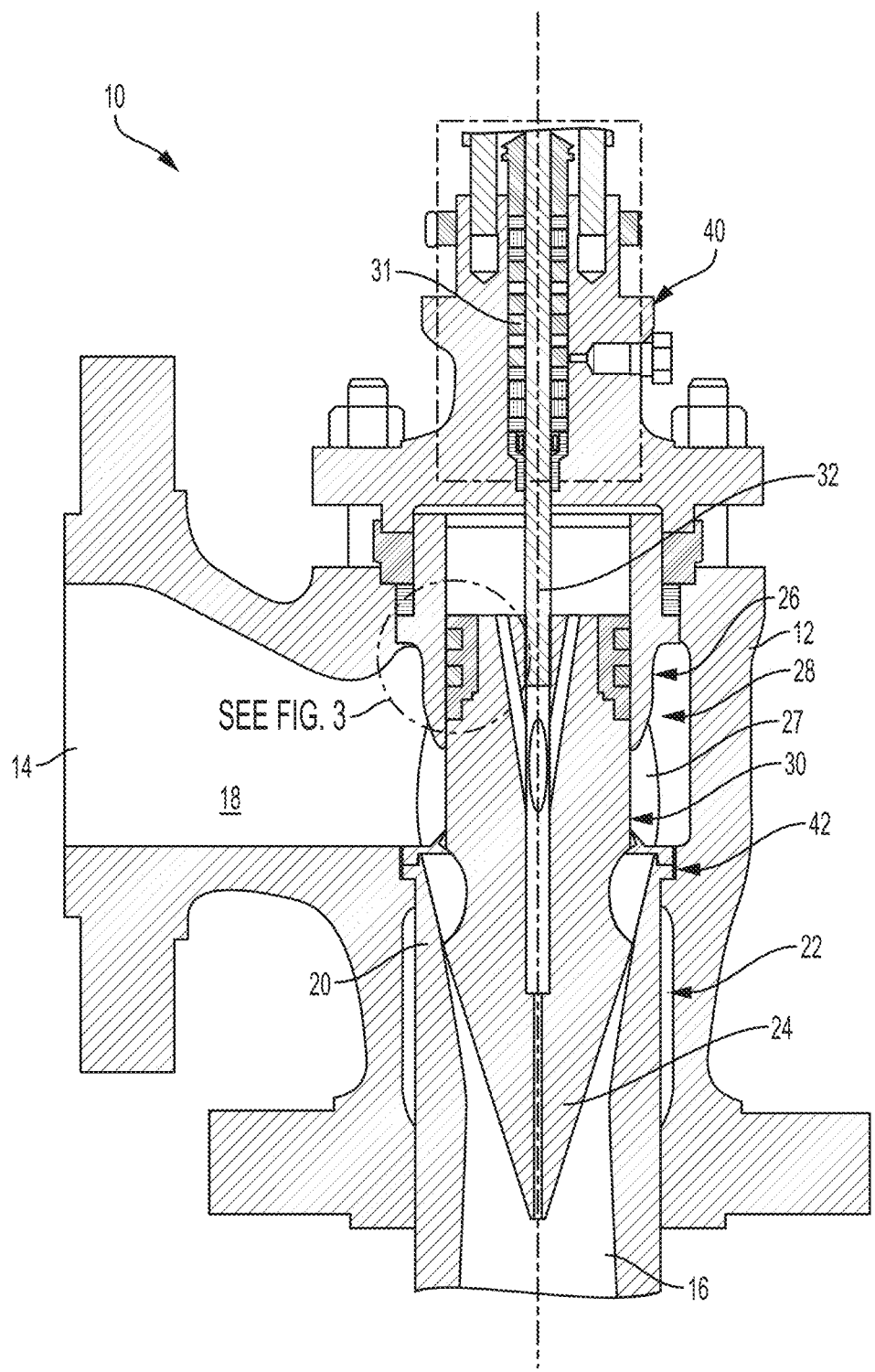
FIG. 1 is a cross-sectional view of a pressure regulator including a trim assembly constructed in accordance with the teachings of the disclosure.

Turning now to FIG. 1, a pressure regulator 10 includes a valve body 12 having a fluid inlet 14 and a fluid outlet 16 connected by a fluid passageway 18. An orifice 20 is disposed between the fluid inlet 14 and the fluid outlet 18. A valve seat 22 is disposed within the fluid passageway 18. A movable valve plug 24 is disposed within the fluid passageway 18, the valve plug 24 interacting with the valve seat 22 to selectively open or close the fluid passageway 18. The valve seat 22 may be welded, bolted, clamped, or hung/threaded in the valve body 12.

A cage 26 is disposed in the fluid passageway 18. The cage 26 surrounds the valve plug 24, and the cage 26 includes a mechanical stop 30 that limits movement of the valve plug 24 within the cage 26 in a direction away from the valve seat 22. The valve plug 24 contacts the mechanical stop 30 in a fully retracted position thereby preventing any further movement of the valve plug 24, relative to the cage 26, in a direction away from the valve seat 22. The cage 26 may also include one or more openings 27 that allow fluid to flow through the cage 26 when the valve plug 24 is in an open position, spaced away from the valve seat 22. The openings 27 may characterize fluid flow through the cage 26, for example, by smoothing the flow, and/or by reducing a pressure gradient.

The valve plug 24 and the cage 26 form a trim assembly 28. In some embodiments, the trim assembly 28 may also include one or more of the valve seat 22 and a valve stem 32. The trim assembly 28 is configured to be removable from the valve body 12 as a unit. In other words, at least the valve plug 24 and the cage 26 are removed as a single unit from the valve body 12 during repair or replacement of the trim assembly 28. This configuration advantageously reduces repair or replacement time and/or eliminates the need to tap additional bores in the cage 26 if the cage 26 is stuck within the valve body 12.

Conventional packing and/or seals 31 may be provided around the valve stem 32 to enable the valve stem 32 to reciprocate with little to no leakage. The valve stem 32 couples to the valve plug 24 at one end and to an actuator (not shown) at the other. The actuator reciprocatingly moves the valve stem 32, thereby moving the valve plug 24 between open and closed positions.

The pressure regulator 10 may include a bonnet 40 that is attached to the valve body 12. The bonnet 40 is removable from the valve body 12 to allow installation and or removal of the trim assembly 28. The bonnet 40 may compress the cage 26 against the valve seat 22 to retain the valve seat 22 within the valve body 12. Other arrangements are possible, for example including additional elements such as load rings, when building control valves. As such, the present invention is not limited to the specific example configuration illustrated in the figures, but can include known variations.

In some embodiments, a gasket 42 may be installed between the valve seat 22 and the valve body 12 to prevent leaks when the valve plug 24 is in a closed position against the valve seat 22.

Figure 2:
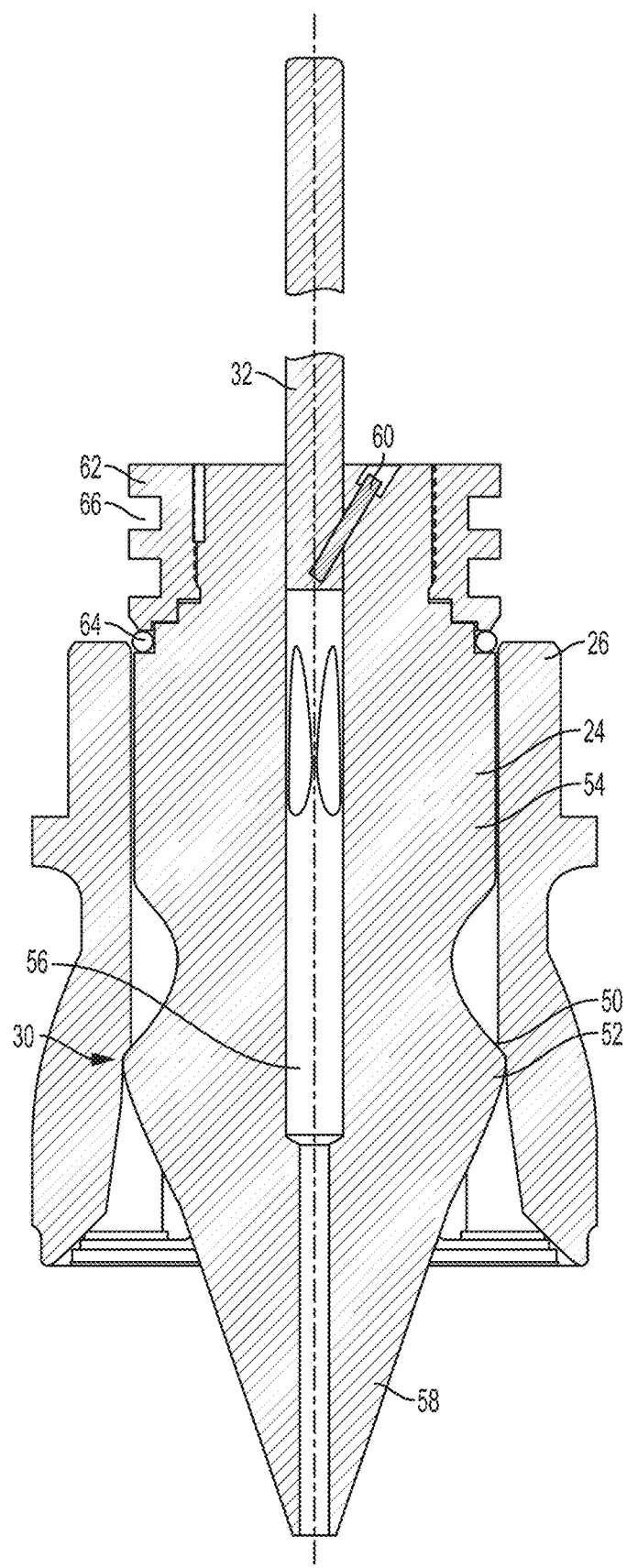
FIG. 2 is a cross-sectional view of a valve plug and a cage of the trim assembly of FIG. 1.

Turning now to FIG. 2, in some embodiments, the mechanical stop 30 is formed by an internal ring 50 that has a smaller diameter than a widest diameter on the valve plug 24. The widest diameter of the valve plug 24 may be formed by an annular ridge 52. The annular ridge 52 contacts the internal ring 50 when the valve plug 24 is in a fully retracted position. The annular ridge 52 prevents further relative movement (in the upward direction in FIG. 2) between the valve plug 24 and the cage 26.

The valve plug 24 may include a plug body 54 having one or more balance passages 56. In other embodiments, the plug body 54 may not have balance passages 56. A tapered end 58 extends away from the plug body 54, towards the valve seat 22 (not shown in FIG. 2). The annular ridge 52 may form a junction between the plug body 54 and the tapered end 58. In other embodiments, the annular ridge 52 may be formed at other locations on the plug body 54.

The valve stem 32 is secured to the valve plug 24. In the illustrated embodiment, a pin 60 secures the valve stem 32 to the valve plug 24. In other embodiments, other connection structures may secure the valve stem 32 to the valve plug 24. For example, a threaded, crimped, or welded connection may be used in other embodiments.

A plug seal retainer 62 is located at one end of the plug body 54 (distal to the tapered end 58 in the illustrated embodiment). The plug seal retainer 62 secures a plug seal 64 against the plug body 54 so that the plug seal 64 may seal the plug body 54 and the cage 26 when the valve plug 24 is disposed within the cage 26. The plug seal retainer 62 may include one or more annular channels 66 for receiving additional seals (such as PTFE or graphite seal rings), if desired.

Turning now to FIG. 3, the cage 26 includes a first region 70 having a first diameter, a second region 72 having a second diameter, and a third region 74 having a third diameter. The first diameter is larger than the second diameter and the second diameter is larger than the third diameter. Each of the first diameter, the second diameter, and the third diameters are larger than the internal ring diameter. In other words, the internal ring diameter forms the third diameter 74, which is the smallest internal diameter of the cage 26.

The first region 70 accommodates a piston ring 76, the second region 72 accommodates the plug seal 64, and the third region 74 forms a guide surface for the plug body 54. The first region 70 is located farther from the valve seat 22 than the second region 72, and the second region 72 is located farther from the valve seat 22 than the third region 74.

Turning now to FIG. 4, a close-up view of the mechanical stop 30 is illustrated. When the valve plug 24 is in a fully retracted position (which is illustrated in FIG. 4), the annular ridge 52 on the valve body 54 contacts the internal ring 50 on the cage 26. Thus, any force away from the valve seat 22

(e.g., to the left in FIG. 4) that is applied to the valve plug 24 (for example, by pulling on the valve stem, not shown) is transferred to the cage 26. Thereafter, the cage 26 and the valve plug 24 move as a unit in the direction away from the valve seat 22.

Figure 5:
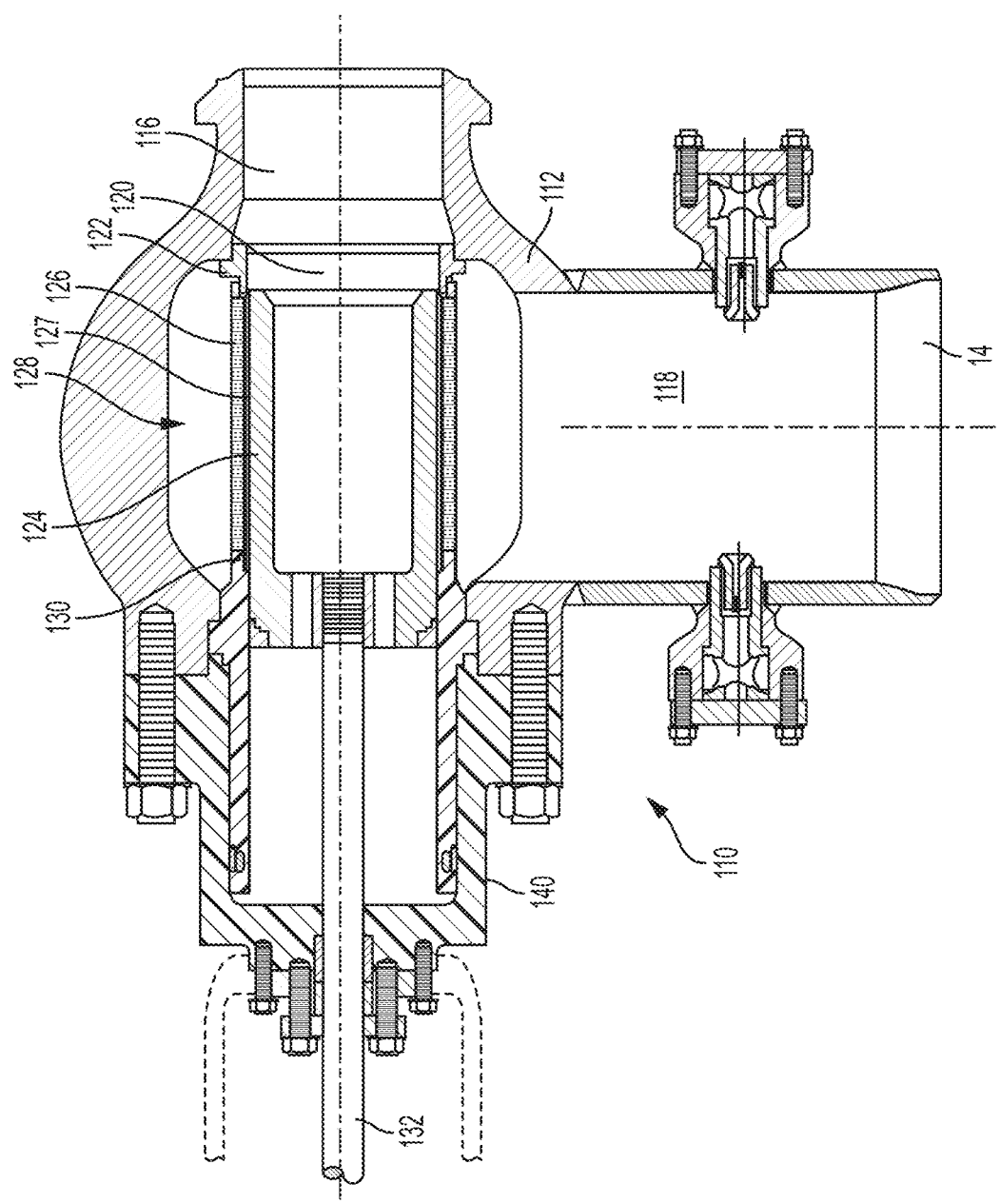
FIG. 5 is a cross-sectional view of an alternate embodiment of a pressure regulator including a trim assembly constructed in accordance with the teachings of the disclosure.
Figure 6:
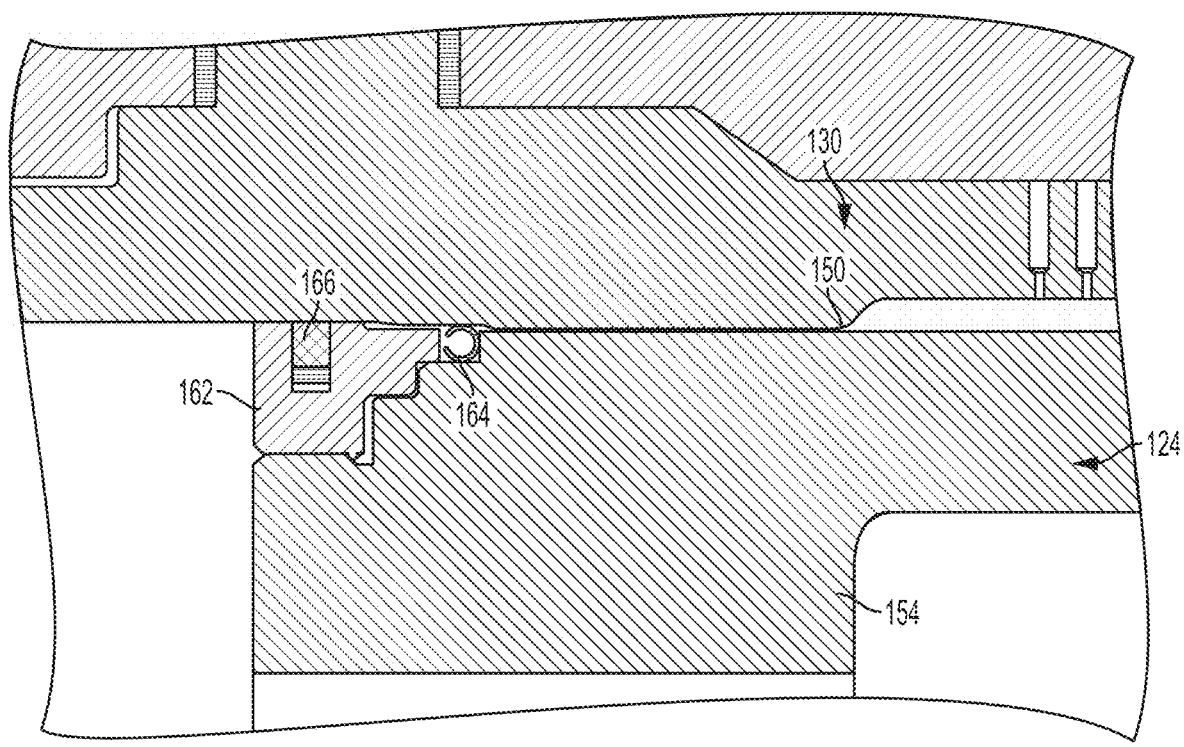
FIG. 6 is an enlarged cross-sectional view of the trim assembly of FIG. 5, with a valve plug being disposed in partially extended position relative to a valve seat.
Figure 7:
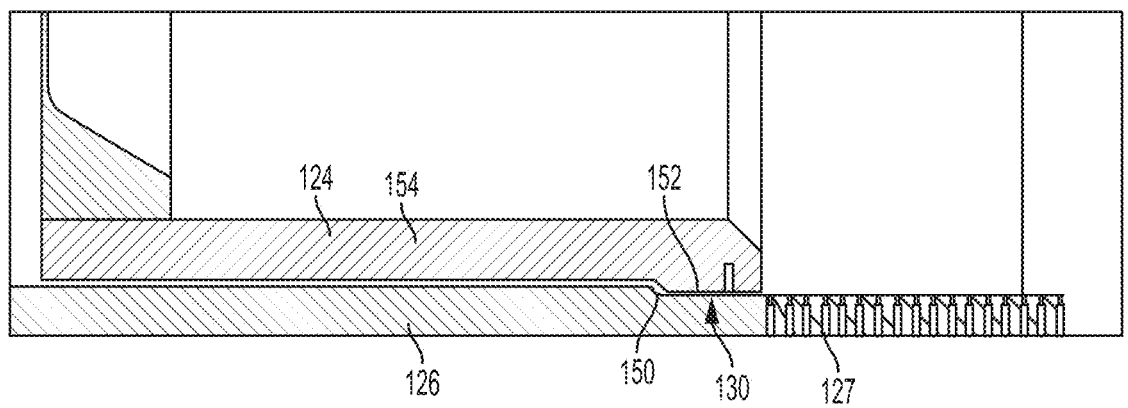
FIG. 7 is an enlarged cross-sectional view of the trim assembly of FIG. 5, with the valve plug being in a retracted position relative to the valve seat, the valve plug engaging a mechanical stop on a cage.

Turning now to FIGS. 5-7, an alternate embodiment of a pressure regulator 110 is illustrated. In the embodiment of FIGS. 5-7, components that correspond to components of the embodiment of FIGS. 1-4 are labeled with reference numbers that are exactly 100 greater than the embodiment of FIGS. 1-4. For example, the pressure regulator of the embodiment of FIGS. 5-7 is labeled "110" while the pressure regulator of the embodiment of FIGS. 1-4 is labeled "10".

The pressure regulator 110 includes a valve body 112 having a fluid inlet 114 and a fluid outlet 116 connected by a fluid passageway 118. An orifice 120 is disposed between the fluid inlet 114 and the fluid outlet 118. A valve seat 122 is disposed within the fluid passageway 118. A movable valve plug 124 is disposed within the fluid passageway 118, the valve plug 124 interacts with the valve seat 122 to selectively open or close the fluid passageway 118. A cage 126 is disposed in the fluid passageway 118. The cage 126 surrounds the valve plug 124, and the cage 126 includes a mechanical stop 130 that limits movement of the valve plug 124 within the cage 126 in a direction away from the valve seat 122. The valve plug 124 contacts the mechanical stop 130 in a fully retracted position thereby preventing any further movement of the valve plug 124 relative to the cage, away from the valve seat 122. The cage 126 may also include one or more openings 127 that allow fluid to flow through the cage 126 when the valve plug 124 is in an open position, spaced away from the valve seat 122. The openings 127 may characterize fluid flow through the cage 126, for example, by smoothing the flow, and/or by reducing a pressure gradient.

The valve plug 124 and the cage 126 form a trim assembly 128. In some embodiments, the trim assembly 128 may also include one or more of the valve seat 122 and a valve stem 132. The trim assembly 128 is configured to be removable from the valve body 112 as a unit. In other words, at least the valve plug 124 and the cage 126 are removed as a single unit from the valve body 112 during repair or replacement of the trim assembly 128. This configuration advantageously reduces repair or replacement time and/or eliminates the need to tap additional bores in the cage 126 if the cage 126 is stuck within the valve body 112.

The pressure regulator 110 may include a bonnet 140 that is attached to the valve body 112. The bonnet 140 is removable from the valve body 112 to allow installation and or removal of the trim assembly 128.

In some embodiments, the mechanical stop 130 is formed by an internal ring 150 that has a smaller diameter than a widest diameter on the valve plug 124. The widest diameter of the valve plug 124 may be formed by an annular ridge 152. The annular ridge 152 contacts the internal ring 150 when the valve plug 124 is in a fully retracted position. The annular ridge 152 prevents further movement between the valve plug 124 and the cage 126 when the annular ridge 152 is engaged with the internal ring 150.

A plug seal retainer 162 is located at one end of the plug body 154. The plug seal retainer 162 secures a plug seal 164 against the plug body 154 so that the plug seal 164 may seal the plug body 154 and the cage 126 when the valve plug 124 is disposed within the cage 126. The plug seal retainer 162 may include one or more annular channels 166 for receiving additional seals (such as PTFE or graphite seal rings), if desired.

When the valve plug 124 is in a fully retracted position (which is illustrated in FIG. 7), the annular ridge 152 of on the valve body 154 contacts the internal ring 150 on the cage 126. Thus, any force away from the valve seat 122 that is applied to the valve plug 124 (for example, by pulling on the valve stem) is transferred to the cage 126. Thereafter, the cage 126 and the valve plug 124 move as a unit in the direction away from the valve seat 122.

A method of removing a trim assembly 28, 128 from a pressure regulator 10, 110 includes removing the bonnet 40, 140 from the pressure regulator 10, 110, pulling on the valve stem 32, 132 that is connected to the valve plug 24, 124 to move the valve plug 24, 124 in relation to the cage 26, 126 until the valve plug 24, 124 engages the mechanical stop 30, 130 on the valve cage 26, 126, and continuing to pull on the valve stem 32, 132 until the valve plug 24, 124 and the cage 26, 126 are extracted from the valve body 12, 112 as a unit.

Although the present invention has been described with reference to the example embodiment illustrated in the figures, it should be understood that many alternative forms can embody the present invention. One of ordinary skill in the art will additionally appreciate different ways to alter the parameters of the embodiments disclosed, such as the size, shape, or type of elements or materials.

This description is to be construed as illustrative only and is for the purpose of teaching those skilled in the art how to make and use the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

What is claimed is:

1. A pressure regulator comprising:
   a valve body having a fluid inlet and a fluid outlet connected by a fluid passageway, and an orifice being disposed between the fluid inlet and the fluid outlet;
   a valve seat disposed within the fluid passageway;
   a movable valve plug, the valve plug being disposed within the fluid passageway, the valve plug interacting with the valve seat to selectively open or close the fluid passageway, the valve plug including an annular ridge; and
   a cage disposed in the fluid passageway, the cage surrounding the valve plug, the cage including a mechanical stop, the annular ridge and the mechanical stop sized to engage one another to thereby limit movement of the valve plug relative to the cage in a direction away from the valve seat,
   wherein the mechanical stop is an internal ring having a diameter that is smaller than a widest diameter of the annular ridge, wherein the annular ridge is disposed a first distance from the valve seat and the mechanical stop is disposed a second distance from the valve seat, the second distance greater than the first distance,
   wherein the cage includes a first region having a first diameter and a second region having a second diameter, the first diameter being larger than the second diameter and both the first and second diameters being larger than the diameter of the internal ring.

2. The pressure regulator of claim 1, wherein the first region accommodates a piston ring and the second region accommodates a bore seal.

3. The pressure regulator of claim 1, wherein the valve seat is one of a welded seat, a bolted seat, a clamped seat, and a hung threaded seat.

4. The pressure regulator of claim 1, further comprising a plug seal retainer, the plug seal retainer securing a plug seal against the valve plug, the plug seal forming a seal between the valve plug and the cage.

5. A pressure regulator comprising:
a valve body having a fluid inlet and a fluid outlet connected by a fluid passageway, and an orifice being disposed between the fluid inlet and the fluid outlet;
a valve seat disposed within the fluid passageway;
a movable valve plug, the valve plug being disposed within the fluid passageway, the valve plug interacting with the valve seat to selectively open or close the fluid passageway; and
a cage disposed in the fluid passageway, the cage surrounding the valve plug, the cage including a mechanical stop that limits movement of the valve plug relative to the cage away from the valve seat;
wherein the mechanical stop is an internal ring having a smaller diameter than a widest diameter on the valve plug;
wherein the cage includes a first region having a first diameter and a second region having a second diameter, the first diameter being larger than the second diameter and both the first and second diameters being larger than the internal ring diameter; and
wherein the first region is located farther from the valve seat than the second region.

6. The pressure regulator of claim 5, wherein the first region accommodates a piston ring and the second region accommodates a bore seal.

7. The pressure regulator of claim 5, wherein the valve plug includes a balance passage.

8. The pressure regulator of claim 5, wherein the valve seat is one of a welded seat, a bolted seat, a clamped seat, and a hung threaded seat.

9. The pressure regulator of claim 5, further comprising a plug seal retainer, the plug seal retainer securing a plug seal against the valve plug, the plug seal forming a seal between the valve plug and the cage.

10. A trim assembly for a pressure regulator, the trim assembly comprising:
a valve seat;
a valve plug, the valve plug being movable relative to the valve seat, the valve plug interacting with the valve seat to selectively open or close the valve seat, the valve plug including an annular ridge; and
a cage disposed in the fluid passageway, the cage surrounding the valve plug, the cage including a mechanical stop, the annular ridge and the mechanical stop sized to engage one another to thereby limit movement of the valve plug relative to the cage in a direction away from the valve seat,
wherein the annular ridge is disposed a first distance from the valve seat and the mechanical stop is disposed a second distance from the valve seat, the second distance greater than the first distance,
wherein the mechanical stop is an internal ring having a diameter that is smaller than a widest diameter of the valve plug, and
wherein the cage includes a first region having a first diameter and a second region having a second diameter, the first diameter being larger than the second diameter and both the first and second diameters being larger than the diameter of the internal ring.

11. The trim assembly of claim 10, wherein the first region accommodates a piston ring and the second region accommodates a bore seal.

12. The trim assembly of claim 10, wherein the valve seat is one of a welded seat, a bolted seat, a clamped seat, and a hung threaded seat.

13. The trim assembly of claim 10, further comprising a plug seal retainer, the plug seal retainer securing a plug seal against the valve plug, the plug seal forming a seal between the valve plug and the cage.

14. A trim assembly for a pressure regulator, the trim assembly comprising:
a valve seat;
a valve plug, the valve plug being movable relative to the valve seat, the valve plug interacting with the valve seat to selectively open or close the valve seat; and
a cage disposed in the fluid passageway, the cage surrounding the valve plug, the cage including a mechanical stop that limits movement of the valve plug relative to the cage away from the valve seat;
wherein the mechanical stop is an internal ring having a smaller diameter than a widest diameter on the valve plug;
wherein the cage includes a first region having a first diameter and a second region having a second diameter, the first diameter being larger than the second diameter and both the first and second diameters being larger than the internal ring diameter; and
wherein the first region is located farther from the valve seat than the second region.

15. The trim assembly of claim 14, wherein the first region accommodates a piston ring and the second region accommodates a bore seal.

16. The trim assembly of claim 14, wherein the valve plug includes a balance passage.

17. The trim assembly of claim 14, wherein the valve seat is one of a welded seat, a bolted seat, a clamped seat, and a hung threaded seat.

18. The trim assembly of claim 14, further comprising a plug seal retainer, the plug seal retainer securing a plug seal against the valve plug, the plug seal forming a seal between the valve plug and the cage.

19. A method of removing a trim assembly from a pressure regulator, the method comprising:
removing a bonnet from a pressure regulator;
pulling on a valve stem that is connected to a valve plug to move the valve plug in relation to a cage until the valve plug engages a mechanical stop on the cage; and
continuing to pull on the valve stem until the valve plug and the cage are extracted from a valve body as a unit; and
forming the mechanical stop by an internal ring having a smaller diameter than a largest diameter of the valve plug;
wherein the cage includes a first region having a first diameter and a second region having a second diameter, the first diameter being larger than the second diameter and both the first and second diameters being larger than the internal ring diameter; and
locating the first region farther from a valve seat than the second region.

* * * * *

UNITED STATES PATENT AND TRADEMARK OFFICE
CERTIFICATE OF CORRECTION

PATENT NO. : 10,655,745 B2  
APPLICATION NO. : 15/922853  
DATED : May 19, 2020  
INVENTOR(S) : Yan Qiu et al.

Page 1 of 1

It is certified that error appears in the above-identified patent and that said Letters Patent is hereby corrected as shown below:

In the Specification

At Column 1, Line 65, "accordance an" should be -- accordance with an --.

At Column 4, Line 3, "and or" should be -- and/or --.

At Column 5, Lines 52-53, "and or" should be -- and/or --.

At Column 6, Line 5, "of on the valve body 154" should be -- of the plug body 154 --.

In the Claims

At Column 8, Line 51, "cage; and" should be -- cage; --.

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*